US012494151B2

United States Patent
Willem et al.

(10) Patent No.: US 12,494,151 B2
(45) Date of Patent: Dec. 9, 2025

(54) METHOD AND APPARATUS OF GENERATING DRIVE SIGNAL FOR LIGHT EMITTING ELEMENT

(71) Applicant: BARCO NV, Kortrijk (BE)

(72) Inventors: Patrick Albin Willem, Ostend (BE); Wim Van Eessen, Kruishoutem (BE)

(73) Assignee: BARCO NV, Kortrijk (BE)

( * ) Notice: Subject to any disclaimer, the term of this patent is extended or adjusted under 35 U.S.C. 154(b) by 58 days.

(21) Appl. No.: 18/559,247

(22) PCT Filed: May 24, 2022

(86) PCT No.: PCT/EP2022/063955
§ 371 (c)(1),
(2) Date: Nov. 6, 2023

(87) PCT Pub. No.: WO2022/248424
PCT Pub. Date: Dec. 1, 2022

(65) Prior Publication Data

US 2024/0379040 A1 Nov. 14, 2024

(30) Foreign Application Priority Data

May 27, 2021 (SE) .................................. 2150669-6

(51) Int. Cl.
*G09G 3/20* (2006.01)
*G09G 3/3225* (2016.01)

(52) U.S. Cl.
CPC ......... *G09G 3/2029* (2013.01); *G09G 3/2037* (2013.01); *G09G 3/3225* (2013.01); *G09G 2300/0842* (2013.01)

(58) Field of Classification Search
CPC ......... G09G 2300/0842; G09G 3/2029; G09G 3/2037; G09G 3/3225; G09G 3/3216;
(Continued)

(56) References Cited

U.S. PATENT DOCUMENTS 7,227,519 B1 6/2007 Kawase et al.
10,909,926 B2 * 2/2021 Lin ..................... G09G 3/3258
(Continued)

FOREIGN PATENT DOCUMENTS

EP 3627490 A1 3/2020
JP 6232590 B2 * 11/2017 .......... G09G 3/2022
(Continued)

OTHER PUBLICATIONS

International Search Report and Written Opinion issued in PCT/EP2022/063955, dated Jan. 2, 2023, 29 pages provided.
(Continued)

*Primary Examiner* — Ricardo Osorio
(74) *Attorney, Agent, or Firm* — HSML P.C.

(57) ABSTRACT

A method for generating a drive signal for driving a light emitting element of a display. The method includes: dividing the M bits into M−N1+1 data ranges, each including N1 consecutive bits of the M bits; determining N2 bits for uniquely identifying the M−N1+1 data ranges; generating a coded signal of N1+N2 bits for representing the M bits of the input signal; based on the coded signal, generating the drive signal comprising a sequence of N1 bits, each bit of said sequence of N1 bits controlling a current through the light emitting element or a voltage across the light emitting element, during a time interval, one bit at a time.

16 Claims, 7 Drawing Sheets

| | | Range1 | Range2 | Range3 | Range4 | Range5 | Range6 | Range7 | Range8 |
|---|---|---|---|---|---|---|---|---|---|
| | =L/.. | b15=1 | b15=0 | b15=0 | b15=0 | b15=0 | b15=0 | b15=0 | b15=0 |
| b15 | 2 | 100,00% | b14=1 | b14=0 | b14=0 | b14=0 | b14=0 | b14=0 | b14=0 |
| b14 | 4 | 50,00% | 100,00% | b13=1 | b13=0 | b13=0 | b13=0 | b13=0 | b13=0 |
| b13 | 8 | 25,00% | 50,00% | 100,00% | b12=1 | b12=0 | b12=0 | b12=0 | b12=0 |
| b12 | 16 | 12,50% | 25,00% | 50,00% | 100,00% | b11=1 | b11=0 | b11=0 | b11=0 |
| b11 | 32 | 6,25% | 12,50% | 25,00% | 50,00% | 100,00% | b10=1 | b10=0 | b10=0 |
| b10 | 64 | 3,13% | 6,25% | 12,50% | 25,00% | 50,00% | 100,00% | b9=1 | b9=0 |
| b9 | 128 | 1,56% | 3,13% | 6,25% | 12,50% | 25,00% | 50,00% | 100,00% | b8=1 |
| b8 | 256 | 0,78% | 1,56% | 3,13% | 6,25% | 12,50% | 25,00% | 50,00% | 100,00% |
| b7 | 512 | 0,39% | 0,78% | 1,56% | 3,13% | 6,25% | 12,50% | 25,00% | 50,00% |
| b6 | 1024 | 0,20% | 0,39% | 0,78% | 1,56% | 3,13% | 6,25% | 12,50% | 25,00% |
| b5 | 2048 | 0,10% | 0,20% | 0,39% | 0,78% | 1,56% | 3,13% | 6,25% | 12,50% |
| b4 | 4096 | 0,05% | 0,10% | 0,20% | 0,39% | 0,78% | 1,56% | 3,13% | 6,25% |
| b3 | 8192 | 0,02% | 0,05% | 0,10% | 0,20% | 0,39% | 0,78% | 1,56% | 3,13% |
| b2 | 16384 | 0,01% | 0,02% | 0,05% | 0,10% | 0,20% | 0,39% | 0,78% | 1,56% |
| b1 | 32768 | 0,01% | 0,01% | 0,02% | 0,05% | 0,10% | 0,20% | 0,39% | 0,78% |
| b0 | 65536 | 0,00% | 0,01% | 0,01% | 0,02% | 0,05% | 0,10% | 0,20% | 0,39% |

(58) Field of Classification Search
CPC ........... G09G 5/005; G09G 2300/0814; G09G 2300/0852; G09G 2300/0857; G09G 2300/0861; G09G 2300/0876; G09G 2310/0251; G09G 2340/02; G09G 3/32; G09G 2340/0428; G09G 3/2033
See application file for complete search history.

(56) References Cited

U.S. PATENT DOCUMENTS

| | | | | |
|---|---|---|---|---|
| 11,087,674 | B2 * | 8/2021 | Chang | G09G 3/3225 |
| RE49,692 | E * | 10/2023 | Newton | H04N 9/64 375/240.01 |
| 2007/0252733 | A1 | 11/2007 | Thebault et al. | |
| 2014/0079113 | A1 * | 3/2014 | Newton | G09G 5/02 375/240.01 |
| 2015/0161945 | A1 | 6/2015 | Kawabe | |
| 2016/0358531 | A1 | 12/2016 | Nakakita et al. | |
| 2017/0270845 | A1 * | 9/2017 | Kuo | G09G 3/32 |
| 2019/0347994 | A1 | 11/2019 | Lin et al. | |
| 2022/0383814 | A1 * | 12/2022 | Van Eessen | G09G 3/3233 |

FOREIGN PATENT DOCUMENTS

| | | | | |
|---|---|---|---|---|
| JP | 2023536983 | A * | 8/2023 | |
| KR | 20210066764 | A * | 6/2021 | |
| WO | WO-2009064352 | A1 * | 5/2009 | G09G 3/2022 |
| WO | WO-2019185935 | A1 * | 10/2019 | G06F 3/1446 |
| WO | WO-2021064061 | A1 * | 4/2021 | G09G 3/32 |
| WO | WO-2021225064 | A1 * | 11/2021 | G09G 3/3233 |

OTHER PUBLICATIONS

Communication issued in European Application No. 22732437.3, mailed May 7, 2025.

* cited by examiner

| | | Range1 | Range2 | Range3 | Range4 | Range5 | Range6 | Range7 | Range8 |
|---|---|---|---|---|---|---|---|---|---|
| | =L/.. | b15=1 | b15=0 | b15=0 | b15=0 | b15=0 | b15=0 | b15=0 | b15=0 |
| b15 | 2 | 100,00% | b14=1 | b14=0 | b14=0 | b14=0 | b14=0 | b14=0 | b14=0 |
| b14 | 4 | 50,00% | 100,00% | b13=1 | b13=0 | b13=0 | b13=0 | b13=0 | b13=0 |
| b13 | 8 | 25,00% | 50,00% | 100,00% | b12=1 | b12=0 | b12=0 | b12=0 | b12=0 |
| b12 | 16 | 12,50% | 25,00% | 50,00% | 100,00% | b11=1 | b11=0 | b11=0 | b11=0 |
| b11 | 32 | 6,25% | 12,50% | 25,00% | 50,00% | 100,00% | b10=1 | b10=0 | b10=0 |
| b10 | 64 | 3,13% | 6,25% | 12,50% | 25,00% | 50,00% | 100,00% | b9=1 | b9=0 |
| b9 | 128 | 1,56% | 3,13% | 6,25% | 12,50% | 25,00% | 50,00% | 100,00% | b8=1 |
| b8 | 256 | 0,78% | 1,56% | 3,13% | 6,25% | 12,50% | 25,00% | 50,00% | 100,00% |
| b7 | 512 | 0,39% | 0,78% | 1,56% | 3,13% | 6,25% | 12,50% | 25,00% | 50,00% |
| b6 | 1024 | 0,20% | 0,39% | 0,78% | 1,56% | 3,13% | 6,25% | 12,50% | 25,00% |
| b5 | 2048 | 0,10% | 0,20% | 0,39% | 0,78% | 1,56% | 3,13% | 6,25% | 12,50% |
| b4 | 4096 | 0,05% | 0,10% | 0,20% | 0,39% | 0,78% | 1,56% | 3,13% | 6,25% |
| b3 | 8192 | 0,02% | 0,05% | 0,10% | 0,20% | 0,39% | 0,78% | 1,56% | 3,13% |
| b2 | 16384 | 0,01% | 0,02% | 0,05% | 0,10% | 0,20% | 0,39% | 0,78% | 1,56% |
| b1 | 32768 | 0,01% | 0,01% | 0,02% | 0,05% | 0,10% | 0,20% | 0,39% | 0,78% |
| b0 | 65536 | 0,00% | 0,01% | 0,01% | 0,02% | 0,05% | 0,10% | 0,20% | 0,39% |

Fig 2a

| 15 | 14 | 13 | 12 | 11 | 10 | 9 |
|---|---|---|---|---|---|---|
| 1 | x | x | x | x | x | x |
| 0 | 1 | x | x | x | x | x |
| 0 | 0 | 1 | x | x | x | x |
| 0 | 0 | 0 | 1 | x | x | x |
| 0 | 0 | 0 | 0 | 1 | x | x |
| 0 | 0 | 0 | 0 | 0 | 1 | x |
| 0 | 0 | 0 | 0 | 0 | 0 | 1 |
| 0 | 0 | 0 | 0 | 0 | 0 | 0 |

Fig 2b

| | | | | | | | | |
|---|---|---|---|---|---|---|---|---|
| b15 | b14 | b13 | b12 | b11 | b10 | b9 | b8 | b7 |
| b14 | b13 | b12 | b11 | b10 | b9 | b8 | b7 | b6 |
| b13 | b12 | b11 | b10 | b9 | b8 | b7 | b6 | b5 |
| b12 | b11 | b10 | b9 | b8 | b7 | b6 | b5 | b4 |
| b11 | b10 | b9 | b8 | b7 | b6 | b5 | b4 | b3 |
| b10 | b9 | b8 | b7 | b6 | b5 | b4 | b3 | b2 |
| b9 | b8 | b7 | b6 | b5 | b4 | b3 | b2 | b1 |
| b8 | b7 | b6 | b5 | b4 | b3 | b2 | b1 | b0 |

Fig 2c

| 11 | 10 | 9 | 8 | 7 | 6 | 5 | 4 | 3 | 2 | 1 | 0 |
|---|---|---|---|---|---|---|---|---|---|---|---|
| 0 | 0 | 0 | b15 | b14 | b13 | b12 | b11 | b10 | b9 | b8 | b7 |
| 0 | 0 | 1 | b14 | b13 | b12 | b11 | b10 | b9 | b8 | b7 | b6 |
| 0 | 1 | 0 | b13 | b12 | b11 | b10 | b9 | b8 | b7 | b6 | b5 |
| 0 | 1 | 1 | b12 | b11 | b10 | b9 | b8 | b7 | b6 | b5 | b4 |
| 1 | 0 | 0 | b11 | b10 | b9 | b8 | b7 | b6 | b5 | b4 | b3 |
| 1 | 0 | 1 | b10 | b9 | b8 | b7 | b6 | b5 | b4 | b3 | b2 |
| 1 | 1 | 0 | b9 | b8 | b7 | b6 | b5 | b4 | b3 | b2 | b1 |
| 1 | 1 | 1 | b8 | b7 | b6 | b5 | b4 | b3 | b2 | b1 | b0 |

Fig 3a

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| b15 | b14 | b13 | b12 | b11 | b10 | b9 | b8 | b7 | 0 | 0 | 0 | 0 | 0 | 0 | 0 |
| 0 | b14 | b13 | b12 | b11 | b10 | b9 | b8 | b7 | b6 | 0 | 0 | 0 | 0 | 0 | 0 |
| 0 | 0 | b13 | b12 | b11 | b10 | b9 | b8 | b7 | b6 | b5 | 0 | 0 | 0 | 0 | 0 |
| 0 | 0 | 0 | b12 | b11 | b10 | b9 | b8 | b7 | b6 | b5 | b4 | 0 | 0 | 0 | 0 |
| 0 | 0 | 0 | 0 | b11 | b10 | b9 | b8 | b7 | b6 | b5 | b4 | b3 | 0 | 0 | 0 |
| 0 | 0 | 0 | 0 | 0 | b10 | b9 | b8 | b7 | b6 | b5 | b4 | b3 | b2 | 0 | 0 |
| 0 | 0 | 0 | 0 | 0 | 0 | b9 | b8 | b7 | b6 | b5 | b4 | b3 | b2 | b1 | 0 |
| 0 | 0 | 0 | 0 | 0 | 0 | 0 | b8 | b7 | b6 | b5 | b4 | b3 | b2 | b1 | b0 |

Fig 3b

| b15=1 | | | | | | | | | | | | | | | | | | | | | |
|---|---|---|---|---|---|---|---|---|---|---|---|---|---|---|---|---|---|---|---|---|---|
| | b15 | | | | | | | | b14 | | | | b13 | | b12 | b11 | b10 | b9 | b8 | b7 | |
| **Tweight** | 16 | | | | | | | | 8 | | | | 4 | | 2 | **1** | | | | | |
| count | 2 | 2 | 2 | 2 | 2 | 2 | 2 | 2 | 2 | 2 | 2 | 2 | 2 | 2 | 2 | 1 | 1 | 1 | 1 | 1 | **35** |
| number | 16 | | | | | | | | 8 | | | | 4 | | 2 | 1 | 0,5 | 0,25 | 0,125 | 0,0625 | 31,938 |

Fig 4a

| b15=0 b14=1 | | | | | | | | | | | | | | | | | | | | | |
|---|---|---|---|---|---|---|---|---|---|---|---|---|---|---|---|---|---|---|---|---|---|
| | **b6** | | | | | | | | b14 | | | | b13 | | b12 | b11 | b10 | b9 | b8 | b7 | |
| **Tweight** | 16 | | | | | | | | 8 | | | | 4 | | 2 | **1** | | | | | |
| count | 3 | 1 | 3 | 1 | 3 | 1 | 3 | 1 | 3 | 1 | 3 | 1 | 2 | 2 | 2 | 1 | 1 | 1 | 1 | 1 | **35** |
| number | 0 | 0,0313 | 0 | 0 | 0 | 0 | 0 | 0 | 8 | | | | 4 | | 2 | 1 | 0,5 | 0,25 | 0,125 | 0,0625 | 15,969 |

Fig 4b

| b15=0 b14=0 b13=1 | | | | | | | | | | | | | | | | | | | | | |
|---|---|---|---|---|---|---|---|---|---|---|---|---|---|---|---|---|---|---|---|---|---|
| | b6 | | **b5** | | | | | | | | | | b13 | | b12 | b11 | b10 | b9 | b8 | b7 | |
| **Tweight** | 16 | | | | | | | | 8 | | | | 4 | | 2 | **1** | | | | | |
| count | 3 | 1 | 3 | 1 | 3 | 1 | 3 | 1 | 3 | 1 | 3 | 1 | 2 | 2 | 2 | 1 | 1 | 1 | 1 | 1 | **35** |
| number | 0 | 0,0313 | 0 | 0,0156 | 0 | 0 | 0 | 0 | 0 | | | | 4 | | 2 | 1 | 0,5 | 0,25 | 0,125 | 0,0625 | 7,9844 |

Fig 4c

METHOD AND APPARATUS OF GENERATING DRIVE SIGNAL FOR LIGHT EMITTING ELEMENT

TECHNICAL FIELD

The present document relates to a method and an apparatus for generating a drive signal for driving a light emitting element of a display, a method and a driver circuit for driving a light emitting element of a display. Particularly, the present document relates to a method and an apparatus for generating a drive signal for driving a pixel or sub-pixel of a High Dynamic Range, HDR, display.

BACKGROUND

High dynamic range (HDR) is a term often used in the field of display technique, photography technique, and digital imaging technique, etc. HDR display technique can improve the way light is represented, by overcoming the limits of the standard format, such as Standard Dynamic Range (SDR). HDR offers the possibility to represent substantially both brighter highlights, and darker shadows with more details. Common HDR formats include HDR10, HDR10+, and HLG.

HDR display devices capable of presenting a greater dynamic range have been studies for decades, primarily with flat panel technologies like plasma, SED/FED and OLED. HDR display technique typically does not increase display's capabilities, rather it allows to make better use of displays having high brightness, contrast and colours capabilities.

MicroLED, also known as micro-LED or μLED, is an emerging flat-panel display technology. The μLED displays comprise arrays of microscopic LEDs as light emitting elements, e.g., pixel elements. The μLED displays are considered to be advantageous over LCD displays, including higher brightness, lower latency, higher contrast ratio, and greater colour saturation, plus intrinsic self-illumination and better efficiency. Consequently, it is desirable to use the μLED displays as HDR display devices.

Because of the increased dynamic range, displaying HDR contents needs to be driven by a larger number of bits, e.g., 16 bits or 22 bits, than SDR which typically uses 8 or 10 bits, to cover the much larger dynamic range of brightness.

However, the larger number of bits for driving a HDR display may cause difficulties in HDR implementation, including the manufacturing, test and assembling. For example, if there are 22 bits, the value of the most significant bit (MSB) can be $2^{22}$ of that of the least significant bit (LSB). Thus, a high data bandwidth, a high data processing capability and a large data storage capability are needed for driving a HDR display, which would increase the complexity of the HDR display. Further, a silicon based microprocessor (MCU) would be necessary to drive such high speed digital signals, which may be difficult for certain HDR displays due to technology limitation or restrictions, such as thin-film-transistor (TFT) display manufactured by thin-film technology.

Thus, there is a need to provide an improved method and system for driving a HDR display.

SUMMARY

It is an object of the present disclosure, to provide an improved a method and an apparatus for generating a drive signal for driving a light emitting element of a display, a method and driver circuit for driving a light emitting element of a display, which eliminates or alleviates at least some of the disadvantages of the prior art.

The invention is defined by the appended independent claims. Embodiments are set forth in the appended dependent claims, and in the following description and drawings.

According to a first aspect, there is provided a method for generating a drive signal for driving a light emitting element of a display, the method comprising:

- receiving an input data comprising M bits, $b_0, b_1, \ldots, b_{M-1}$, for driving the light emitting element, wherein each bit has a value of 0 or 1;
- dividing the M bits into M−N1+1 data ranges, each comprising N1 consecutive bits of the M bits, wherein N1<M;
- determining N2 bits for uniquely identifying the M−N1+1 data ranges;
- generating a coded signal for representing the M bits of the input signal, wherein the coded signal comprises N1+N2 bits,
  - a first part of the coded signal comprising N2 bits for identifying one of the M−N1+1 data ranges, and
  - a second part of the coded signal comprising N1 bits being the N1 consecutive bits $b_i, \ldots, b_{i+N1-1}$, of said identified data range, wherein N1+N2<M, i>=0, i+N1−1<=M−1;
- based on the coded signal, generating the drive signal comprising a sequence of N1 bits, each bit of said sequence of N1 bits controlling a current through the light emitting element or a voltage across the light emitting element, during a time interval, one bit at a time;
- wherein M, N1, N2 and i are natural numbers.

The step of generating a coded signal may comprise: selecting N1 consecutive bits, $b_i, \ldots, b_{i+N1-1}$, of the M bits to be the second part of the coded signal, comprising: determining a most significant bit of the M bits having a value of 1, to be a most significant bit, $b_{i+N-1}$, of the selected N1 consecutive bits, such that the selected N1 consecutive bits are determined to be $b_i, \ldots, b_{i+N1-1}$; if said most significant bit, $b_{i+N1-1}$, is less significant than $b_{N1-1}$, or if none of the M bits has a value of 1, the selected N1 consecutive bits are determined to be the least significant N1 bits, $b_0, \ldots, b_{N1-1}$, of the M bits.

The step of determining N2 bits for uniquely identifying the M−N1+1 data ranges may comprise calculating N2 by performing a ceiling function on $\log_2(M-N1+1)$.

The step of generating the drive signal may comprise determining the time interval for each bit of said sequence of N1 bits.

The step of determining the time interval may comprise: selecting a pointer bit $b_x$ among the M bits, and determining its time interval $T_x$ to be $T_0$; for a more significant bit $b_{x+j}$ of the pointer bit $b_x$, determining its time interval $T_{x+j}$ to be $2^j*T_0$; and for a less significant bit $b_{x-j}$ of the pointer bit $b_x$, determining its time interval $T_{x-j}$ to be $2^{-j}*T_0$; wherein x and j are natural numbers, x+j<=M−1, and x−j>=0.

Said sequence of N1 bits may control the current through the light emitting element or the voltage across the light emitting element, for a fixed time period T.

The fixed time period T may be determined based on the time intervals of the most significant N1 consecutive bits, $b_{M-N1}, \ldots, b_{M-1}$, of the M bits; wherein the fixed time period T is determined by summing the time intervals of the most significant N1 consecutive bits, $b_{M-N1}, \ldots, b_{M-1}$, of the M bits, comprising: for each bit $b_{x+j}$ of the most significant N1 consecutive bits being more significant than the pointer bit $b_x$, adding its timer interval $T_{x+j}$, for the pointer bit $b_x$, adding its timer interval $T_0$, and for each bit $b_{x-j}$ of the most significant N1 consecutive bits being less significant than the pointer bit $b_x$, adding one time interval $T_0$.

The fixed time period T may be an integer multiple of $T_0$, i.e. $T=(2^{M-x}-1+x-M+N1)*T_0$; wherein a first $2^{M-1-x}$ of $T_0$ of the fixed time period T is reserved for the most significant bit, $b_{M-1}$, for controlling the current through the light emitting element or the voltage across the light emitting element; a next $2^{M-2-x}$ of $T_0$ of the fixed time period T is reserved for the second most significant bit, $b_{M-2}$, for controlling the current through the light emitting element or the voltage across the light emitting element; . . . , and a last $T_0$ is reserved for the least significant bit, $b_{M-N1}$, for controlling the current through the light emitting element or the voltage across the light emitting element.

The step of generating the drive signal based on the coded signal may comprise: each bit of said N1 bits of the coded signal belonging to the most significant N1 consecutive bits, $b_{M-N1}, \ldots, b_{M-1}$, controlling the current through the light emitting element or the voltage across the light emitting element for a period of a number of $T_0$ within the fixed timer period T reserved for this bit, and each bit of said N1 bits of the coded signal not belonging to the most significant N1 consecutive bits, $b_{M-N1}, \ldots, b_{M-1}$, controlling the current through the light emitting element or the voltage across the light emitting element for a period of one $T_0$ within the fixed timer period T reserved for one of the most significant N1 consecutive bits which is not a part of said N1 bits.

The method may comprise providing a reset signal to override the drive signal to force a bit of said sequence of the N1 bits to stop controlling the current or the voltage before an end of its time interval.

The reset signal may override a bit having a time interval shorter than $T_0$.

The method may comprise providing a reset flag to enable or to disable the reset signal for each bit of said sequence of N1 bits.

M may be larger or equal to 16.

N1 may be equal to any of 8, 9, 10, preferably 9.

The light emitting element may be a pixel, or a sub-pixel.

The drive signal may be a Pulse-width Modulation, PWM, signal. A period of the PWM signal may be the fixed time period T.

According to a second aspect, there is provided an apparatus for generating a drive signal for driving a light emitting element of a display, the apparatus comprising:

a processing circuit configured to:

divide an input data comprising M bits, $b_0, b_1, \ldots, b_{M-1}$, for driving the light emitting element into M−N1+1 data ranges, each comprising N1 consecutive bits of the M bits, wherein N1<M, wherein each bit has a value of 0 or 1;

determine N2 bits for uniquely identifying the M−N1+1 data ranges;

generate a coded signal for representing the M bits of the input signal, wherein the coded signal comprises N1+N2 bits, a first part of the coded signal comprising N2 bits for identifying one of the M−N1+1 data ranges, and a second part of the coded signal comprising N1 bits being the N1 consecutive bits $b_i, \ldots, b_{i+N1-1}$, of said identified data range, wherein $N1+N2<M$, $i>=0$, $i+N1-1<=M-1$;

based on the coded signal, generate the drive signal comprising a sequence of N1 bits, each bit of said sequence of N1 bits controlling a current through the light emitting element or a voltage across the light emitting element during a time interval, one bit at a time;

wherein M, N1, N2 and i are natural numbers.

According to a third aspect, there is provided a driver circuit for driving a light emitting element (146) of a display, the driver circuit comprising:

a loading element (148) for receiving a second part of a drive signal, and loading a second storage element (147) with the second part of the drive signal;

the second storage element (147) for storing the second part of the drive signal;

a control element (143) having a first control electrode (1433) for controlling a current through the light emitting element (146) or a voltage across the light emitting element (146);

a first storage element (144) for storing a first part of the drive signal, said drive signal being applied to the first control electrode (1433) of the control element (143);

a transfer element (142) having a second control electrode for loading the first storage element (144) with the second part of the drive signal;

a reset element (149) for shunting the first storage element (144) or the light emitting element (146), wherein the reset element (149) is configured to be controlled by a reset signal RST_B and a reset flag, wherein the reset flag is configured to enable or disable the reset signal RST_B for each bit of the drive signal.

The loading element (148) may be configured to receive the reset flag and to load the second storage element (147) with the reset flag. The second storage element (147) may be configured to store the reset flag.

The reset flag may comprise one or more bits.

The control element (143) may be a transistor and the first control electrode (1433) may be the gate of the transistor (143). The first storage element (144) may be capacitor. The second storage element (147) may be a capacitor. The transfer element (142) may be a transistor. The reset element (149) may be a reset transistor. The loading element (148) may be a loading transistor.

The first and/or second storage element may be configured to store one bit data.

The loading element (148) may be configured to connect to a data line for receiving the second part of the drive signal generated by the method of any of the first aspect, and/or by the apparatus of the second aspect. The loading element (148) may be configured to connect to the data line for receiving the reset flag.

According to a fourth aspect, there is provided a method for driving a light emitting element (146) of a display by using the driver circuit, the method comprising:

a control element (143) controlling a current through the light emitting element (146) or a voltage across the light emitting element (146) based on a first part of a drive signal stored on a first storage element (144);

a reset element 149 shunting the first storage element (144) or the light emitting element (146) based on a reset signal RST_B and a reset flag, wherein the reset flag is configured to enable or disable the reset signal RST_B for each bit of the drive signal;

a loading element (148) loading a second storage element with a second part of the drive signal while the current through the light emitting element or the voltage across the light emitting element is controlled by the first part of the drive signal;

a transfer element (142) transferring the second part of the drive signal from the second storage element to the first storage element.

According to a fifth aspect, there is provided a display comprising a plurality of light emitting elements, and a plurality of driver circuits of the third aspect for respectively driving the plurality of light emitting elements.

The display may be a High Dynamic Range, HDR, display. The display may be a thin-film-transistor, TFT, display.

BRIEF DESCRIPTION OF THE DRAWINGS

FIG. 2*a* is an example of input data.

FIG. 2*b*-2*c* is an example of dividing input data into data ranges.

FIG. 3*a* is an example of a coded signal.

FIG. 3*b* is an example of a decoded input data.

FIG. 4*a*-4*d* are examples of time intervals for each bit of a sequence of bits of a drive signal.

DESCRIPTION OF EMBODIMENTS

The present invention will now be described more fully hereinafter with reference to the accompanying drawings, in which currently preferred embodiments of the invention are shown.

Figure 1:
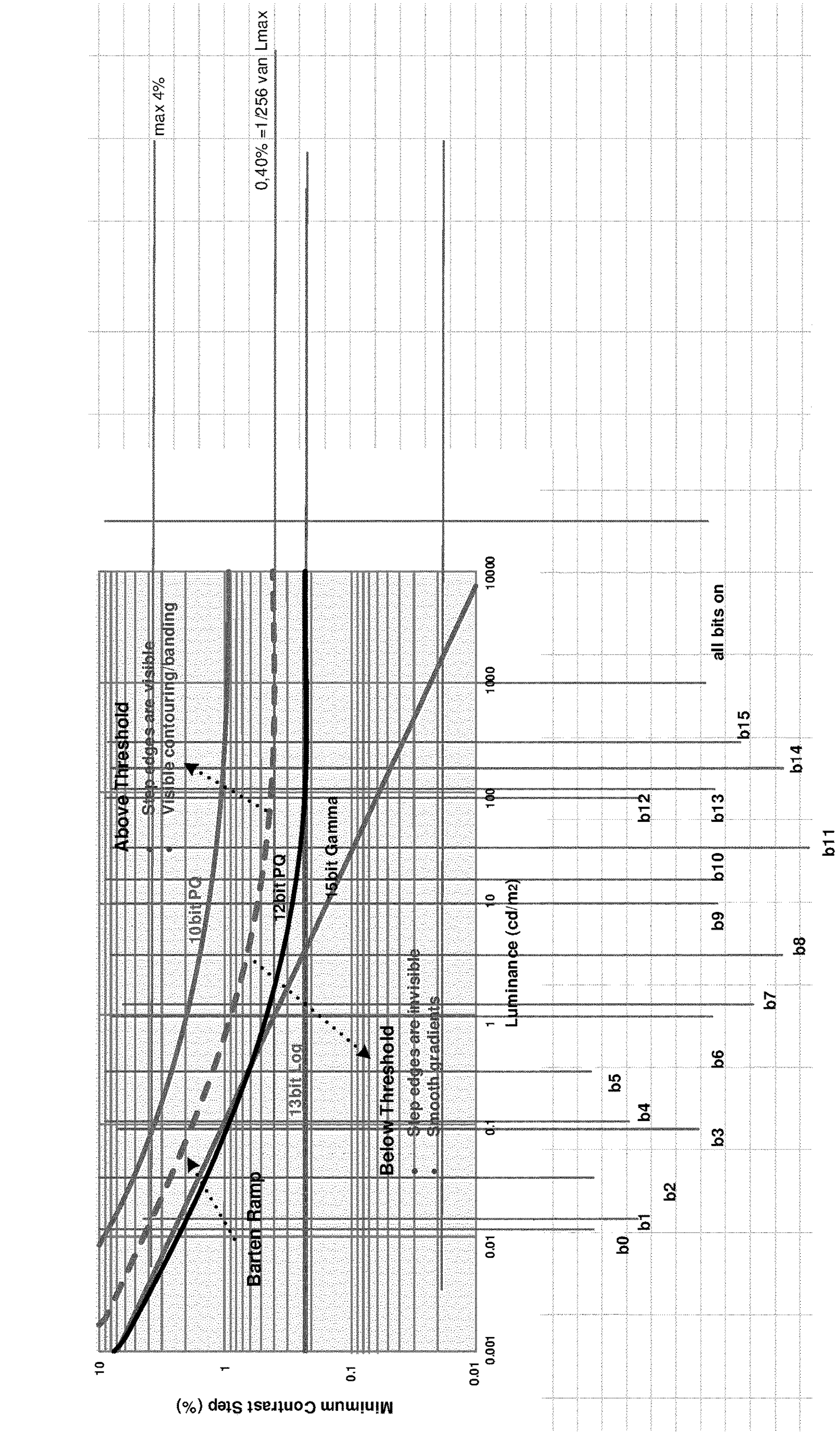
FIG. 1 is a plot of Barten curve.

FIG. 1 is plot of Barten curve, showing a relationship between luminance of a pixel and minimum contrast step (i.e. threshold of contrast step) being visible at this momentary brightness of a pixel.

The x-axis is luminance (i.e. brightness) of a pixel, from 0.001 to 10000 cd/$m^2$. The y-axis is the minimum contrast step having a unit of percentage (%).

The luminance of a pixel is also known as luminous intensity or brightness of a pixel. The SI unit is the candela per square meter (cd/$m^2$), which is also known as nit. In this application, the term "luminance" and "brightness" are interchangeable.

Along the x-axis of FIG. 1, 16 bits, $b_0$, $b_1$, . . . , $b_{15}$, are marked corresponding to a luminance. However, from FIG. 1 it is clear that the 16 bits, $b_0$, $b_1$, . . . , $b_{15}$, cannot cover the whole luminance range of 0.001 to 10000 cd/$m^2$ along the x-axis. Thus, in order to cover the whole luminance range of 0.001 to 10000 cd/$m^2$, a few more bits are needed. Typically, 22 bits are used to cover this luminance range.

However, studies on the number of used bits and the sensitivity of human eyes show that not all the luminance represented by the 22 bits are visible to human eyes at a time. Rather, only the luminance represented by a limited number of bits are visible, depending on the momentary brightness of the pixel. In other words, not all the available bits, no matter 22 bits or 16 bits, need to be present all the time for driving a light emitting element of an HDR display.

The result of the studies can be simplified to the Barten Ramp of FIG. 1, which is a dashed curve. For any momentary brightness of a pixel, the minimum contrast step above the Barten Ramp are visible to human eyes, and the minimum contrast step below the Barten Ramp are invisible to human eyes.

From FIG. 1, it is clear that for higher brightness (the right end of the FIG. 1), the contrast step is about 0.4%, which is almost 1/256 ($2^{-8}$ if represented in binary) of the maximum brightness.

For example, n bits, $b_0$, $b_1$, . . . , $b_{n-1}$, are used for covering zero to Lmax=$2^{n-1}$ for representing brightness.

It is common to assign each bit a position number, ranging from zero ("0") to n−1, where n is the number of bits in the binary representation used.

The least significant bit (LSB) is a bit position in a binary integer giving the unit value, i.e. $b_0$. The LSB is sometimes referred to as the low-order bit or right-most bit. The least significant bits are the bits of the number closest to and including the LSB.

The most significant bit (MSB) is the bit position in a binary number having the greatest value, i.e. $b_{n-1}$. The MSB is sometimes referred to as the high-order bit or left-most bit. The most significant bits are the bits of the number closest to and including the MSB.

The brightness for each bit of the n bits, $b_0$, $b_1$, . . . , $b_{n-1}$, is defined as follows:

$b_{n-1}$=50% Lmax
$b_{n-2}$=25% Lmax
$b_{n-3}$=12.5% Lmax
$b_{n-4}$=6.25% Lmax
$b_{n-5}$=3.13% Lmax
$b_{n-6}$=1.56% Lmax
$b_{n-7}$=0.78% Lmax
$b_{n-8}$=0.39% Lmax
$b_{n-9}$=0.19% Lmax
$b_{n-10}$=0.09% Lmax
. . .

For example, when $b_{n-1}$ is set to a value of "1", the pixel is controlled to show a minimum of 50% of Lmax. According the FIG. 1, the minimum contrast steps below 0.4% are invisible to human eyes. In other words, the brightness less than 0.2% Lmax is invisible (0.4%*50% Lmax=0.2% Lmax). Since $b_{n-9}$=0.19% Lmax, all bits less significant than $b_{n-9}$ (i.e. $b_0$, . . . , $b_{n-10}$) are invisible to human eyes, at this moment. That is, it is generally sufficient to use 9 bits, $b_{n-9}$, $b_{n-8}$, . . . , $b_{n-1}$, to drive a pixel of a HDR display, when $b_{n-1}$ is set to a value of "1". The number of bits can be reduced from n bits to 9 bits.

Further, if $b_{n-1}$ is set to a value of "0" and $b_{n-2}$ is set to a value of "1", it is sufficient to use 9 bits, $b_{n-10}$, $b_{n-8}$, . . . , $b_{n-2}$, to drive the pixel. In other words, all bits less significant than $b_{n-10}$ (i.e. $b_0$, . . . , $b_{n-11}$) are invisible to human eyes, at this moment.

However, since human eyes are not equally sensitive to different colours, e.g., red, green and blue colours, 8 bits or 10 bits may be used to drive a sub-pixel, instead of 9 bits. Two sub-pixels of a same pixel may be driven by a signal of the same or different number of bits.

A light emitting element may comprise one or more light sources for emitting a light to render an image. A light emitting element may be a pixel, as a unit of an image. A light emitting element may be a sub-pixel of a pixel. One or more sub-pixels of a same pixel may emit light of different or a same colour. Each pixel and each sub-pixel may be controlled individually.

In connection with FIGS. 2*a*-2*c*, data ranges of a coded signal will be discussed in more detail.

According to FIG. 1, if it is determined to use a data range of N1 bits (e.g., 9 bits), the full range of M bits input data can be divided into M−N1+1 ranges, each comprising N1 consecutive bits of the M bits.

In the example of FIG. 2*a*, the input data comprising 16 bits, $b_0$, $b_1$, . . . , $b_{15}$ (i.e. M=16), and the number of bits used is set to 9 (i.e. N1=9).

When $b_{15}$ is set to a value of "1", a first data range, Range1, comprises 9 consecutive bits, $b_7$, . . . , $b_{15}$. When $b_{15}$ is set to a value of "0", and $b_{14}$ is set to a value of "1", a second data range, Range2, comprises 9 consecutive bits, $b_6, \ldots, b_{14}$. When each bit of $b_{15}$ to by is set to a value of "0", and $b_5$ is set to a value of "1", an eighth data range, Range8, comprises 9 consecutive bits, $b_0, \ldots, b_8$.

Further, when each bit of $b_{15}$ to $b_8$ is set to a value of "0", no matter what values the rest of bits are, the data range would be the eighth data range, Range8, comprising 9 consecutive bits, $b_0, \ldots, b_8$.

That is, the input data of 16 bits can be divided into 8 different data ranges, Rangel to Range8, each comprising 9 consecutive bits of the 16 bits of the input data. The brightness for each bit of the 9 consecutive bits of each data range is defined in FIG. 2*a* as in FIG. 1.

FIGS. 2*b*-2*c* show a simple scheme to divide and/or map the input data of FIG. 2*a* to data ranges comprising 9 consecutive bits.

Each row in FIG. 2*b* only shows the values of the seven most significant bits of the 16 bits ($b_9, \ldots, b_{15}$). Other less significant bits are not shown in FIG. 2*b*.

In the first row in FIG. 2*b*, the most significant bit of the 16 bits having a value of 1 is the MSB bit $b_{15}$. Then, a most significant bit, $b_{i+N-1}$, of the selected 9 consecutive bits of this data range is determined to be $b_{15}$. Consequently, the selected 9 consecutive bits are determined to be $b_7, \ldots, b_{15}$, as shown in the first row in FIG. 2*c*, irrespective of the value of any remaining bits, $b_0, \ldots, b_{14}$.

In the second row in FIG. 2*b*, the most significant bit of the 16 bits having a value of 1 is the bit $b_{14}$ ($b_{15}$=0). Then, a most significant bit, $b_{i+N-1}$, of the selected 9 consecutive bits of this data range is determined to be $b_{14}$. Consequently, the selected 9 consecutive bits are determined to be $b_6, \ldots, b_{14}$, as shown in the second row in FIG. 2*c*, irrespective of the value of any remaining bits, $b_0, \ldots, b_{13}$.

In the last row in FIG. 2*b*, none of the bits $b_9, \ldots, b_{15}$ has a value of 1, thus the selected 9 consecutive bits are determined to be the least significant 9 bits, $b_0, \ldots, b_8$, irrespective of the value of any of the bits $b_0, \ldots, b_8$.

In connection with FIG. 3*a*, the coded signal will be discussed in more detail.

As discussed above, it is possible to select the data range of N1 bits from the M bits input data in order to form a coded signal. However, just determining the 9 bits of the selected data range is not enough, since there are a plurality of data ranges. Thus, it is also necessary to identify each of the data ranges.

In the example of FIGS. 2*a* and 2*c*, there are 8 different data ranges. Since each bit has two different values, i.e. 0 or 1, 3 bits ($2^3$=8) are needed to uniquely identify the 8 data ranges.

A number of N2 bits for uniquely identifying the M−N1+1 data ranges may be calculated by performing a ceiling function on $\log_2$ (M−N1+1). For example, if the input data has 22 bits (M=22), and each data range has 9 bits (N1=9), there would be 14 (22−9+1) different data ranges. N2 can be determined by performing a ceiling function on $\log_2 14$, i.e. N2 is determined to be 4. That is, 4 bits ($2^4$=16) are sufficient for uniquely identifying the 14 data ranges.

FIG. 3*a* is an example of the coded signal. Referring to the 8 data ranges of FIG. 2*c*, each data ranges can be uniquely identified by 3 bits. Thus, in this example, the coded signal comprises 12 (9+3) bits, wherein a first part of the coded signal comprising 3 bits for identifying one of the 8 data ranges, and a second part of the coded signal comprising 9 bits being the 9 consecutive bits $b_i, \ldots, b_{i+8}$, of said identified data range. The code signal using only 12 bits to represent the 16 bits of the input data. This may dramatically reduce the number of bits needed for driving a light emitting element.

FIG. 3*b* is an example of a decoded input data. The decoded input data may be generated by a reverse step to restore the input data of M bits based on the coded signal of N1+N2 bits.

For each data range of 9 bits of the coded signal in FIG. 3*a*, the values of these 9 bits are known. Based on the 3 bits of the coded signal for identifying any one of the 8 data ranges in FIG. 3*a*, it is possible to know the position numbers of these 9 bits.

For example, if the 3 s bits are "100", based on row five of FIG. 3*a*, it is known that these 9 bits are $b_3, \ldots, b_{11}$ of the 16 bits input data. Further, it is also known that the most significant bits $b_{12}, \ldots, b_{15}$ all have a value of "0". However, since the remaining bits $b_0, b_1, b_2$ of the input data representing the luminance not visible for human eyes have been "cut off" when the coded signal is generated, the values of those less significant bits $b_0, b_1, b_2$ of the input data cannot be restored. Rather, their values are set to be "0" as shown in FIG. 3*b*.

Although some information of the input data is missing, the possibility to restore/decode the input data based on the coded signal can improve the method by providing flexibilities and opportunities for different usages.

In connection with FIGS. 4*a*-4*d*, the drive signal will be discussed in more detail.

From the coded signal, the N1 bits are determined. Thus, the drive signal comprising a sequence of said N1 bits can be generated based on the coded signal. A current through the light emitting element or a voltage across the light emitting element may be controlled by each bit of said sequence of N1 bits during a time interval, one bit at a time.

For example, the input data comprises 16 bits, $b_0, b_1, \ldots, b_{15}$ (M=16), and the number of bits can be reduced to 9 bits (N1=9). The drive signal comprises a sequence of 9 bits, each bit of said sequence of 9 bits controlling a current through the light emitting element or a voltage across the light emitting element during a time interval, one bit at a time.

The time interval for each bit of said sequence of N1 bits of the drive signal may be determined.

The step of determining the time interval may comprise selecting a pointer bit $b_x$ among the M bits and determining its time interval $T_x$ to be $T_0$. For a more significant bit $b_{x+j}$ of the pointer bit $b_x$, its time interval $T_{x+j}$ may be determined to be $2^j*T_0$. For a less significant bit $b_{x-j}$ of the pointer bit $b_x$, its time interval $T_{x-j}$ may be determined to be $2^{-j}*T_0$. Here, x and j are natural numbers, x+j<=M−1, and x−j>=0.

FIG. 4*a* is an example of the time intervals for each bit of the sequence of 9 bits of the drive signal. The data range of 9 bits comprises the 9 bits, $b_7, b_8, \ldots, b_{15}$.

The pointer bit $b_x$ is selected to be $b_{11}$ in this example. Then, its time interval $T_{11}$ is determined to be $T_0$. For a more significant bit $b_{11+j}$ of the pointer bit $b_{11}$, its time interval $T_{11+j}$ is determined to be $2^j*T_0$. Thus, the time interval $T_{12}$ of the bit $b_{12}$ is determined to be $2^1*T_0$, the time interval $T_{13}$ of the bit $b_{13}$ is determined to be $2^2*T_0, \ldots$, and the time interval $T_{15}$ of the MSB $b_{15}$ is determined to be $2^4*T_0$.

For a less significant bit $b_{11-j}$ of the bit $b_{11}$, its time interval $T_{11-j}$ may be determined to be $2^{-j}*T_0$. Thus, the time interval $T_{10}$ of the bit $b_{10}$ is determined to be $2^{-1}*T_0$, the time interval $T_9$ of the bit be is determined to be $2^{-2}*T_0$, and the time interval $T_7$ of the bit $b_7$ is determined to be $2^{-4}*T_0$.

Consequently, for the 9 bits of the example of FIG. 4*a*, it is determined that the MSB $b_{15}$ lasts for a time interval of $2^4*T_0$ for controlling the current through the light emitting element or the voltage across the light emitting element, . . . , the pointer bit $b_{11}$ lasts for a time interval of $2^0*T_0$ for controlling the current through the light emitting element or the voltage across the light emitting element, . . . , and the LSB $b_7$ lasts for a time interval $2^{-4}*T_0$.

The time period $T_0$ may be determined to be a minimum time unit for driving the light emitting element. For example, the time period $T_0$ may be determined to correspond to a clock signal of a system for driving the light emitting element. Thus, for each less significant bit, $b_7, \ldots, b_{10}$, in this example, at least one time period of $T_0$ is needed instead of a portion of $T_0$, e.g., for programming a value of a next bit of the drive signal.

Thus, a time period T for the drive signal comprising a sequence of 9 bits to control the current through the light emitting element or the voltage across the light emitting element can be calculated by summing the time intervals of the most significant 9 consecutive bits, $b_7, \ldots, b_{15}$, of the 16 bits.

For each bit $b_{11+j}$ being more significant than the pointer bit $b_{11}$, its timer interval $T_{11+j}$ may be added; for the pointer bit $b_{11}$, its timer interval $T_0$ may be added, and for each bit $b_{11-j}$ being less significant than the pointer bit $b_{11}$, one time interval $T_0$ may be added.

For example, there is a sequence of 8 bits, $b_0, b_1, \ldots, b_7$, and the bit $b_2$ is selected to be the pointer bit. The time period T for this sequence can be calculated as:

$$
\begin{aligned}
T &= 2^5 * T_0 + 2^4 * T_0 + \ldots + 2^1 * T_0 + 2^0 * T_0 + T_0 + T_0 \\
&= (2^6 - 1) * T_0 + 2 * T_0 \\
&= 65 * T_0
\end{aligned}
$$

The time period T consists $65*T_0$. Each $T_0$ is reserved for one bit of a value of "0" or "1". However, for the bits $b_0$ and $b_1$, although one $T_0$ is reserved for each of them, they can only control the current or the voltage for a portion of $T_0$, i.e., 25% and 50% of $T_0$, respectively.

If the LSB $b_0$ is selected to be the pointer bit. The time period T for this sequence can be calculated as:

$$
\begin{aligned}
T &= 2^7 * T_0 + 2^6 * T_0 + \ldots + 2^1 * T_0 + 2^0 * T_0 \\
&= (2^8 - 1) * T_0 \\
&= 255 * T_0
\end{aligned}
$$

By selecting different pointer bits, a different time period T (different number of $T_0$) may be achieved. The less significant the point bit, the longer the time period T (the larger number of $T_0$). The more significant the point bit, the shorter the time period T (the smaller number of $T_0$).

Thus, if the input data comprise M bits, the drive signal comprises a sequence of N1 bits, the pointer bit is $b_x$, the time period T can be calculated by $$
\begin{aligned}
T &= 2^{M-1-x} * T_0 + 2^{M-2-x} * T_0 + \ldots + 2^1 * T_0 + T_0 + (x - M + N1) * T_0 \\
&= (2^{M-x} - 1) * T_0 + (x - M + N1) * T_0 \\
&= (2^{M-x} - 1 + x - M + N1) * T_0
\end{aligned}
$$

In the example of FIG. 4*a*, the time period T is $35*T_0$ (M=16, N1=9, x=11).

The time period T of $35*T_0$ may be determined to be a fixed time period T for said sequence of 9 bits of the drive signal for controlling the current through the light emitting element or the voltage across the light emitting element.

The drive signal may be a Pulse-width Modulation (PWM) signal. A period of the PWM signal may be the fixed time period T.

As shown in FIG. 4*a*, a first 16 ($2^{M-1-x}$) of $T_0$ of the fixed time period T is reserved for the MSB $b_{15}$ for controlling the current through the light emitting element or the voltage across the light emitting element. A next 8 ($2^{M-2-x}$) of $T_0$ of the fixed time period T is reserved for the second most significant bit, $b_{M14}$, for controlling the current through the light emitting element or the voltage across the light emitting element. . . . And a last $T_0$ is reserved for the LSB $b_7$ for controlling the current through the light emitting element or the voltage across the light emitting element.

Thus, the time intervals of each bit of the sequence of 9 bits of the drive signal can be determined for controlling the current through the light emitting element or the voltage across the light emitting element.

However, for each bit less significant than the pointer bit $b_{11}$ ($b_7, \ldots, b_{10}$) in this example, since one $T_0$ is reserved for this bit for controlling the current through the light emitting element or the voltage across the light emitting element, it is necessary to stop this bit from controlling the current or the voltage before an end of its time interval $T_0$, such that this bit can actively control for a duration shorter than one $T_0$, such as 50%, 25%, 12.5% or 6.25% of $T_0$.

The method may comprise providing a reset signal to override the drive signal to force a bit of said sequence of the N1 bits to stop controlling the current or the voltage before an end of its time interval.

The reset signal may be used to override the drive signal to force each bit less significant than the pointer bit to stop controlling the current or the voltage before an end of its time interval, such that this bit can actively control for a duration shorter than one $T_0$, such as 50%, 25%, 12.5% or 6.25% of $T_0$.

The reset signal may override a bit having a time interval shorter than $T_0$.

The higher the number of $T_0$ of the fixed time period T, the shorter the time to program a bit of the drive signal for a next time period of $T_0$.

Thus, the trade-offs may include:

1) increasing the number of $T_0$ to reduce a program time for one $T_0$; and
2) increasing the number of $T_0$ to cause a small reset signal.

Figure 4D:
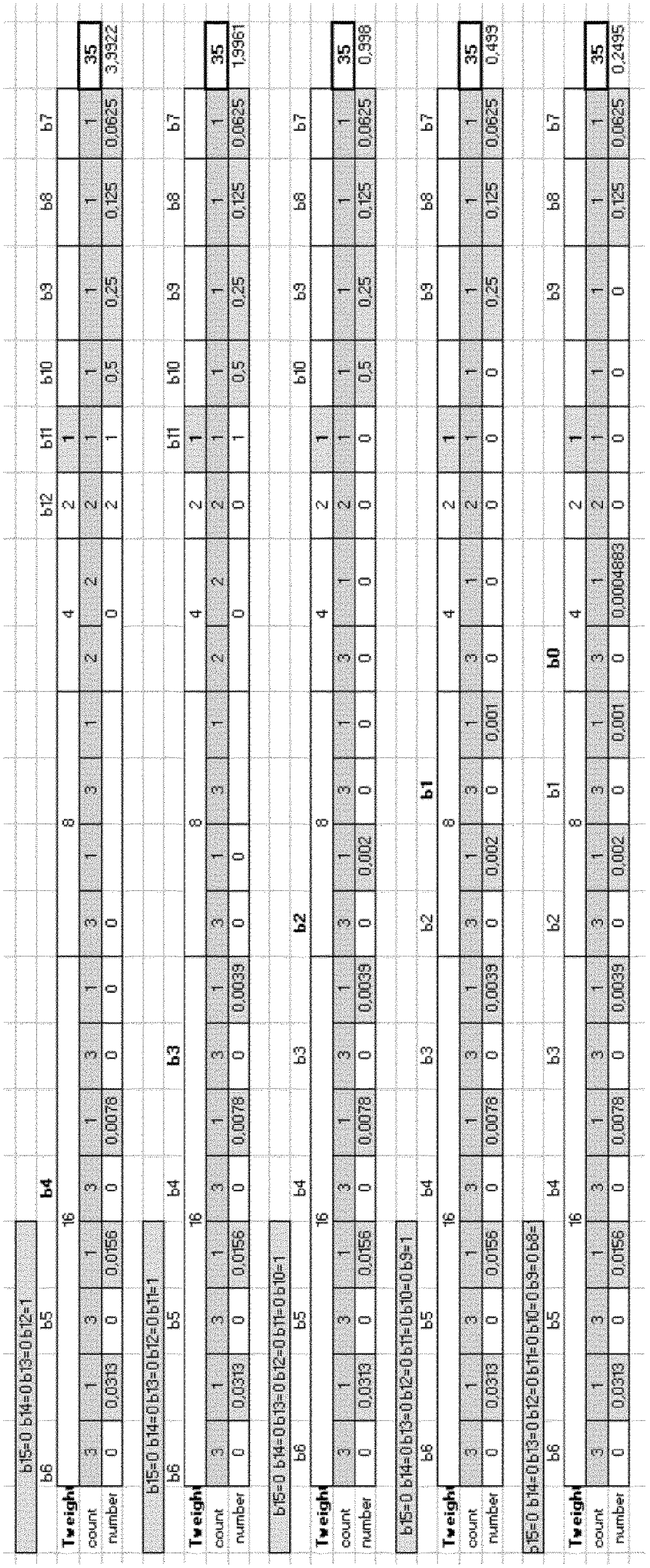

FIGS. 4*b*-4*d* are examples of the time intervals for each bit of the sequence of 9 bits of the drive signal.

In FIG. 4*b*, the data range of 9 bits comprises the 9 bits, $b_6, b_7, \ldots, b_{14}$. As discussed above for FIG. 4*a*, the time period T of $35*T_0$ may be determined to be a fixed time period T for a sequence of 9 bits of any data range, for controlling the current through the light emitting element or the voltage across the light emitting element. Thus, for bits $b_7, b_8, \ldots, b_{14}$, a respective time interval of a number of $T_0$ is reserved within the fixed time period T of $35*T_0$, as shown in FIG. 4*a*. That is, these bits, $b_7, b_8, \ldots, b_{14}$, of said 9 bits belonging to the most significant 9 consecutive bits, $b_7, \ldots, b_{15}$, can control the current or the voltage for a period of a number of $T_0$ within the fixed timer period T reserved for this bit.

Since the bit be does not belong to the most significant 9 consecutive bits of FIG. 4*a*, there is no time interval within the fixed timer period T ($35^*T_0$) reserved for the bit be for controlling the current or the voltage. However, it is noted that the period of $16^*T_0$ within the fixed timer period T reserved for the MSB $b_{15}$ is unoccupied, as the data range of 9 bits, $b_6$, $b_1$, . . . , $b_{14}$, does not comprise the MSB $b_{15}$. Thus, the bit be can use one $T_0$ of the period of $16^*T_0$ reserved for the MSB $b_{15}$ for controlling the current or the voltage for, as shown in FIG. 4*b*.

In FIG. 4*c*, the data range of 9 bits comprises 9 bits, $b_5$, $b_6$, . . . , $b_{13}$. Analogously, for each of the bits $b_7$, $b_8$, . . . , $b_{13}$, the respective time interval of a number of $T_0$ is already reserved within the fixed time period T of $35^*T_0$, as shown in FIG. 4*a*. Thus, these bits $b_7$, $b_8$, . . . , $b_{13}$ of the 9 bits belonging to the most significant 9 consecutive bits, $b_7$, . . . , $b_{15}$, can control the current or the voltage for a period of a number of $T_0$ within the fixed timer period T reserved for this bit.

The bits $b_5$ and $b_6$ can respectively use one $T_0$ of the period of $24^*T_0$ (16+8) reserved for the bits $b_{15}$ and $b_{14}$ for controlling the current or the voltage. In FIG. 4*c*, both of the bits $b_5$ and be use one $T_0$ reserved for the MSB $b_{15}$. However, they may also any one of the unoccupied $24^*T_0$ reserved for the bits $b_{15}$ and $b_{14}$.

FIG. 4*d* are examples of the time intervals for each bit of the sequence of 9 bits of different data ranges with the fixed time period T of $35^*T_0$.

For example, the lowest part of FIG. 4*d* shows the time intervals for each bit of the sequence of 9 bits of the drive signal, wherein the data range of 9 bits comprises 9 bits, $b_0$, $b_1$, . . . , $b_8$. Analogously, for the bits $b_7$ and $b_8$, the respective time interval of one $T_0$ is already reserved within the fixed time period T of $35^*T_0$, as shown in FIG. 4*a*. Thus, these two bits $b_7$ and $b_8$ belonging to the most significant 9 consecutive bits, $b_7$, . . . , $b_{15}$, can control the current or the voltage for a period of one $T_0$ within the fixed timer period T reserved for this bit.

Each of the bits $b_0$, . . . , $b_6$ may use one $T_0$ of the period of $33^*T_0$ (16+8+4+2+1+1+1) reserved for the bits $b_9$, . . . , $b_{15}$ for controlling the current through the light emitting element or the voltage across the light emitting element.

FIGS. 4*b*-4*d* are only examples. Any bits of 9 bits not belonging to the most significant 9 bits may use one of those unoccupied number of $T_0$.

From the examples of FIGS. 4*a*-4*d*, it is clear that by using unoccupied time intervals reserved for the unused significant bit(s), it is possible to use the fixed time period T, e.g., $35^*T_0$, for the N1 bit of different data ranges.

However, the reset signal used for overriding certain bits cannot be provided at a fixed time within the fixed time period T. In other words, depending on the selected N1 bits, or the selected data range of the N1 bits, the reset signal needs to be provided at varied times within the fixed time period T, as the bits to be override may present at different times within the fixed time period T. In other words, the reset signal may vary based on the input data and the coded signal. Thus, one solution is to provide an individual reset signal per light emitting element, e.g., per pixel or per sub-pixel.

In connection with FIG. 5, the reset signal will be discussed in more detail.

Providing an individual reset signal per light emitting element would make the driver system more complicated as a display panel comprises a large number of light emitting elements. Thus, one way to simplify the implementation of the reset signal is to achieve an individual reset signal per light emitting element by using a global reset signal (RST_B) together with a reset flag per light emitting element to enable or to disable the global reset signal for each bit of said sequence of N1 bits of the drive signal.

The global reset signal may occur at fixed locations in a data stream. However, since not every light emitting element needs to be reset, the reset flag per light emitting element may enable or disable the incoming global reset signal, for each bit of said sequence of N1 bits of the drive signal.

Figure 5:
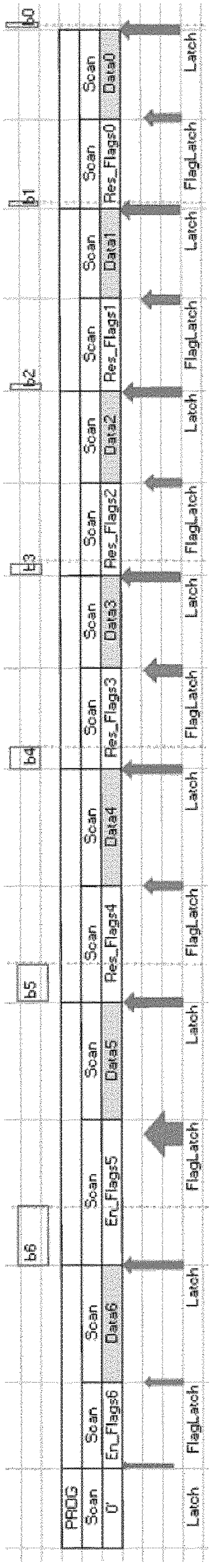
FIG. 5 is an example of a data stream for driving a light emitting element.

FIG. 5 is an example of a data stream for driving the current through the light emitting element or the voltage across the light emitting element. The data stream comprises the drive signal comprising a sequence of 7 bits, $b_0$, . . . , $b_6$. The data stream comprises a reset flag to enable or disable the global reset signal for each bit of the drive signal. The data stream may be read in from a same data line.

Prior to receiving each bit of the sequence of $b_0$, . . . , $b_6$, the reset flag "FlagLatch" is provided indicating whether to enable or disable the global reset signal for this bit. For example, the reset flag for bits $b_6$ and $b_5$ are "En_Flags6" and "En-Flags5", respectively, such that the global reset signal would be enabled for the bits $b_6$ and $b_5$. The reset flag for bits $b_0$, . . . , $b_4$ are "Res_Flags", such that the global reset signal would be disabled for each of the bits $b_0$, . . . , $b_4$.

By limiting the fixed time period T to a reduced number of $T_0$, e.g., comparing to using 16 bits, a subframe may be allowed to repeat multiple times during a frame time.

A frame may refer to one image of e.g. a series of images that makes an animated video. A frame time may refer to a time interval during which a frame is displayed. A typical value of a frame time is 1/60 of a second(s).

For example, if the number of subframes can be represented by $2^x$, e.g., 2, 4, 8, 16, . . . , some bits controlling the current through the light emitting element or the voltage across the light emitting element during a time interval shorter than $T_0$ may be extended to one $T_0$ for a limited number of subframes. This may provide a more tolerant pulse width for these bits having shorter time intervals.

For example, in FIG. 4*a*, the bit $b_{10}$ has a time interval of $0.5^*T_0$. Thus, if there are 8 subframes, the time interval for the bit $b_{10}$ can be relaxed to $T_0$ for 4 subframes instead. The maximal achievable number of subframes is dependent on a maximum scan speed of a display panel.

Thus, the invention allows a higher refresh rate as a reduced number of bits are needed to drive the light emitting element. Further, since the light emitting element may be driven in multiple subframes, the temporal dithering may be alleviated.

The invention allows replacing a traditional HDR driving solution, e.g., a 22-bit HDR driving solution, by a dynamic range of a reduced number of bits. This method can dramatically lower requirements for data bandwidth, data processing capability and data storage capability needed for driving a HDR display. Further, the driver circuit can be achieved by simple electronic components, such as transistors and capacitors, without using any complicated processors. Such simple electronic components can be manufactured by thin-film technology, which is suitable for manufacturing µLED displays.

An apparatus may generate the drive signal for driving a light emitting element of a display. The apparatus comprises a processing circuit for performing the described method for generating a drive signal for driving a light emitting element of a display.

The processing circuit may include a processor, such as a central processing unit (CPU), microcontroller, or microprocessor.

The apparatus may comprise a memory. The processing circuit may be configured to execute program codes stored in the memory, in order to carry out functions and operations of the apparatus.

The memory may be one or more of a buffer, a flash memory, a hard drive, a removable medium, a volatile memory, a non-volatile memory, a random access memory (RAM), or another suitable device. In a typical arrangement, the memory may include a non-volatile memory for long term data storage and a volatile memory that functions as system memory for the apparatus. The memory may exchange data with the processing circuit over a data bus. Accompanying control lines and an address bus between the memory and the processing circuit also may be present.

Functions and operations of the apparatus may be embodied in the form of executable logic routines (e.g., lines of code, software programs, etc.) that are stored on a non-transitory computer readable medium (e.g., the memory) of the apparatus and are executed by the processing circuit. Furthermore, the functions and operations of the apparatus may be a stand-alone software application or form a part of a software application that carries out additional tasks related to the apparatus. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

The apparatus may comprise a user interface. The user interface may be configured to output data and information, e.g., the coded signal or the drive signal, etc. The user interface may be configured to receive data and information, such as the input data comprising M bits, $b_0, b_1, \ldots, b_{M-1}$, for driving the light emitting element, from one or several input devices. The input device may be a computer mouse, a keyboard, a track ball, a touch screen, or any other input device. The user interface may send the received data and information to the processing circuit for further processing.

The apparatus may be attached to a display panel.

Figure 6:
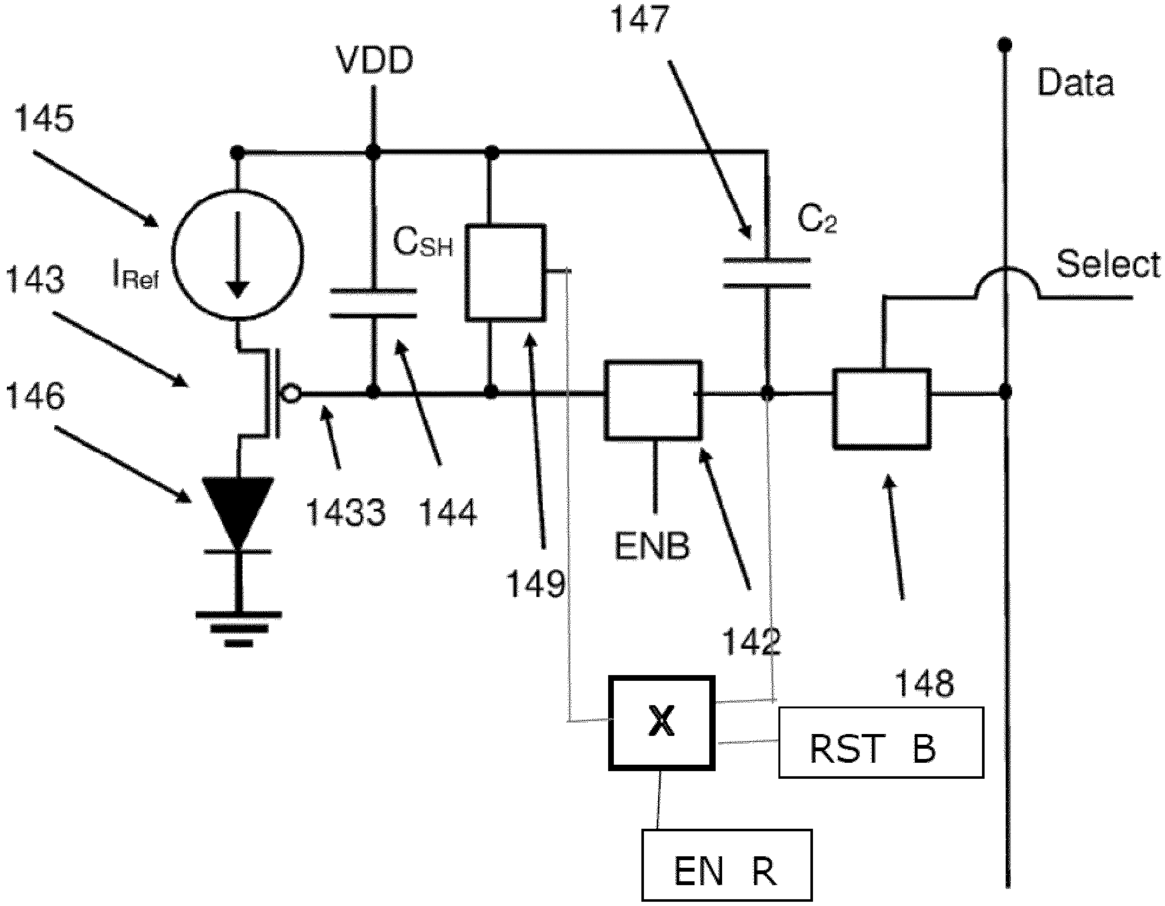
FIG. 6 is an example driver circuit.

In connection with FIG. 6, a driver circuit for driving a light emitting element of a display will be discussed in more detail.

The light emitting element 146 may be an OLED or LED pixel or sub-pixel. The light emitting element 146 may be connected between the control element 143 and a voltage supply VDD.

The control element 143 may be a transistor 143 and its first control electrode 1433 may be the gate of the transistor 143. The transistor 143 may be a pMOS transistor, e.g. a thin film pMOS transistor. The control element 143 may be connected to the light emitting element 146. The control element 143 may be operatively connected with a light source of the light emitting element 146.

The control element 143 may be operatively connected with a current source 145. Alternatively, the control element 143 may be operatively connected with a supply voltage VDD (not shown). The control element 143 controls a current through the light emitting element 146 or a voltage across the light emitting element 146.

The first storage element 144 can be a capacitor $C_{SH}$ or a capacitive circuit such as a sample and hold device having a sample and hold capacitor or an unclocked flip-flop, for storing a part of the drive signal.

The first storage element 144 may be connected between the first control electrode 1433 and the supply voltage VDD.

The second storage element 147 may be a capacitor $C_2$ or a capacitive circuit such as a sample and hold device or an unclocked flip-flop, for storing a part of the drive signal. The second storage element 147 may be connected between the voltage supply VDD and an electrode of a transfer element 142.

The transfer element 142 may be a transistor, for loading the first storage element 144 with the content stored in the second storage elements 147.

The loading element 148 may be a transistor. The loading element 148 may be connected to a data line for receiving a part of a drive signal. The loading element 148 may be configured to load the second storage element 147 with the received part of the drive signal, while the current through the light emitting element or the voltage across the light emitting element is controlled by the content stored in the first storage element 144.

The reset element 149 may be a reset transistor. The reset element 149 may be connected between the voltage supply VDD and the first control electrode 1433. The reset element 149 is controlled by a reset signal (RST_B) and a reset flag. The reset element 149 may be configured to shunt the first storage element 144 or the light emitting element 146 based on the reset signal (RST_B) and the reset flag.

The reset signal (RST_B) may be a global reset signal provided for more than one light emitting element. For example, the reset signal (RST_B) may be globally distributed for resetting each one of the light emitting elements of the display.

The reset flag may be provided for each light emitting element for enabling or disabling the reset signal (RST_B) for each bit of the drive signal. The loading element 148 may be configured to connect to the data line for receiving the reset flag.

Once the reset flag is completely stored in the second storage element 147, a signal EN_R may be activated for loading the reset flag from the second storage element 147 into an element X. The element X may perform a logical function, e.g., a AND function, of the reset flag and the reset signal (RST_B), and generate a result of the logical function. The result may be used to enable or disable the reset element 149.

Thus, by providing a global reset signal (RST_B) and by programming the reset flag, an individual reset for each light emitting element can be achieved. Since the reset flag may be provided individually per pixel, an individual control of reset depending on the data content of the drive signal may be achieved.

The current source 145 may be connected between the voltage source VDD and the control element 143.

The first and/or second storage element 146 may be configured to store one or more bits of the drive signal.

The driver circuit may drive the light emitting element 146 with a PWM signal.

The method for driving the light emitting element 146 of a display may comprise:

- the loading element 148 loading the second storage element 147 with a first bit of the drive signal;
- the transfer element 142 transferring the first bit of the drive signal from the second storage element 147 to the first storage element 144;
- the reset element 149 shunting the first storage element 144 or the light emitting element 146, based on the reset signal (RST_B) and the reset flag;

the control element 143 controlling a current through the light emitting element 146 or a voltage across the light emitting element, based on the first bit of the drive signal;

the loading element 148 loading the second storage element 147 with a second bit of the drive signal; . . .

until the sequence of bits of the drive signal are all read in from the data line.

Thus, the drive circuit for driving the light emitting element of a display may be manufactured by thin-film technology. Advantageously, such drive circuits may be used for driving a pixel or sub-pixel of a μLED display being manufactured by thin-film technology.

The display comprises a plurality of light emitting elements, and a plurality of such driver circuits for respectively driving the plurality of light emitting elements. The light emitting element may be a thin-film-transistor (TFT) pixel.

The display may be a HDR display. The display may be a thin-film-transistor (TFT) display. The display may be a μLED display. The μLED display may have a PWM backplane. Each light emitting element of the display may be driven by a PWM signal.

The invention claimed is:

1. A method for generating a drive signal for driving a light emitting element of a display, the method comprising:

receiving an input data comprising M bits, $b_0, b_1, \ldots, b_{M-1}$, for driving the light emitting element, wherein each bit has a value of 0 or 1;

grouping the M bits into M−N1+1 data ranges, each of the M−N1+1 data ranges comprising N1 consecutive bits of the M bits that are partially overlapping with N1 consecutive bits of another one of the M−N1+1 data ranges, wherein N1<M;

determining a number of N2 bits for uniquely identifying the M−N1+1 data ranges;

generating a coded signal for representing the M bits of the input signal, wherein the coded signal comprises N2+N1 bits, a first part of the coded signal comprising N2 bits for identifying one of the M−N1+1 data ranges, wherein the N2 bits are a combination of 0 or 1 and each unique combination of N2 bits identifies one of the M−N1+1 data ranges, and a second part of the coded signal comprising N1 bits being the N1 consecutive bits $b_i, \ldots, b_{i+N1-1}$, of the M bits corresponding to said identified one of the M−N1+1 data ranges, wherein N1+N2<M, i>=0, i+N1−1<=M−1;

based on the coded signal, generating the drive signal comprising a sequence of N1 bits, each bit of the sequence of N1 bits maintaining a respective bit position in the M bits, each bit of said sequence of N1 bits, having a corresponding value according to the bit position, controlling a current through the light emitting element or a voltage across the light emitting element, during a time interval, one bit at a time;

wherein M, N1, N2 and i are natural numbers.

2. The method of claim 1, wherein the step of generating a coded signal comprises:

selecting N1 consecutive bits, $b_i, \ldots, b_{i+N1-1}$, of the M bits to be the second part of the coded signal, comprising:

determining a most significant bit of the M bits having a value of 1, to be a most significant bit, $b_{i+N-1}$, of the selected N1 consecutive bits, such that the selected N1 consecutive bits are determined to be $b_i, \ldots, b_{i+N1-1}$;

if said most significant bit, $b_{i+N1-1}$, is less significant than $b_{N1-1}$, or if none of the M bits has a value of 1, the selected N1 consecutive bits are determined to be the least significant N1 bits, $b_0, \ldots, b_{N1-1}$, of the M bits.

3. The method of claim 1, wherein the step of determining N2 bits for uniquely identifying the M−N1+1 data ranges comprises:

calculating N2 by performing a ceiling function on $\log_2$ (M−N1+1).

4. The method of claim 1, wherein the step of generating the drive signal comprises:

determining the time interval for each bit of said sequence of N1 bits.

5. The method of claim 4, wherein the step of determining the time interval, comprises:

selecting a pointer bit $b_x$ among the M bits, and determining its time interval $T_x$ to be $T_0$;

for a more significant bit $b_{x+j}$ of the pointer bit $b_x$, determining its time interval $T_{x+j}$ to be $2^j*T_0$; and for a less significant bit $b_{x-j}$ of the pointer bit $b_x$, determining its time interval $T_{x-j}$ to be $2^{-j}*T_0$;

wherein x and j are natural numbers, x+j<=M−1, and x−j>=0.

6. The method of claim 1, wherein said sequence of N1 bits controls the current through the light emitting element or the voltage across the light emitting element, for a fixed time period T.

7. The method of claim 6, wherein the fixed time period T is determined based on the time intervals of the most significant N1 consecutive bits, $b_{M-N1}, \ldots b_{M-1}$, of the M bits;

wherein the fixed time period T is determined by summing the time intervals of the most significant N1 consecutive bits, $b_{M-N1}$, . . . , M−1, of the M bits, comprising:

for each bit $b_{x+j}$ of the most significant N1 consecutive bits being more significant than the pointer bit $b_x$, adding its timer interval $T_{x+j}$, for the pointer bit $b_x$, adding its timer interval $T_0$, and for each bit $b_{x-j}$ of the most significant N1 consecutive bits being less significant than the pointer bit $b_x$, adding one time interval $T_0$.

8. The method of claim 7, wherein the fixed time period T is an integer multiple of $T_0$, i.e. $T=(2^{M-x}-1+x-M+N1)*T_0$;

wherein a first $2^{M-1-x}$ of $T_0$ of the fixed time period T is reserved for the most significant bit, $b_{M-1}$, for controlling the current through the light emitting element or the voltage across the light emitting element;

a next $2^{M-2-x}$ of $T_0$ of the fixed time period T is reserved for the second most significant bit, $b_{M-2}$, for controlling the current through the light emitting element or the voltage across the light emitting element; and a last $T_0$ is reserved for the least significant bit, $b_{M-N1}$, for controlling the current through the light emitting element or the voltage across the light emitting element.

9. The method of claim 8, wherein the step of generating the drive signal based on the coded signal comprises:

each bit of said N1 bits of the coded signal belonging to the most significant N1 consecutive bits, $b_{M-N1}, \ldots, b_{M-1}$, controlling the current through the light emitting element or the voltage across the light emitting element for a period of a number of $T_0$ within the fixed timer period T reserved for this bit, and each bit of said N1 bits of the coded signal not belonging to the most significant N1 consecutive bits, $b_{M-N1}, \ldots, b_{M-1}$, controlling the current through the light emitting element or the voltage across the light emitting element for a period of one $T_0$ within the fixed timer period T reserved for one of the most significant N1 consecutive bits which is not a part of said N1 bits.

10. The method of claim 1, comprising:

providing a reset signal to override the drive signal to force a bit of said sequence of the N1 bits to stop controlling the current or the voltage before an end of its time interval.

11. The method of claim 10, wherein the reset signal overrides a bit having a time interval shorter than $T_0$ and/or comprising providing a reset flag to enable or to disable the reset signal for each bit of said sequence of N1 bits.

12. The method of claim 1, wherein M is larger or equal to 16; and/or wherein N1 is equal to any of 8, 9, 10.

13. The method of claim 1, wherein the light emitting element is a pixel, or a sub-pixel.

14. The method of claim 1, wherein the drive signal is a Pulse-width Modulation, PWM, signal.

15. The method of claim 14, wherein a period of the PWM signal is the fixed time period T.

16. An apparatus for generating a drive signal for driving a light emitting element of a display, the apparatus comprising:

a processing circuit configured to:

group an input data comprising M bits, $b_0, b_1, \ldots, b_{M-1}$, for driving the light emitting element into M−N1+1 data ranges, each of the M−N1+1 data ranges comprising N1 consecutive bits of the M bits that are partially overlapping with N1 consecutive bits of another one of the M−N1+1 data ranges, wherein N1<M, wherein each bit has a value of 0 or 1;

determine a number of N2 bits for uniquely identifying the M−N1+1 data ranges;

generate a coded signal for representing the M bits of the input signal, wherein the coded signal comprises N2+N1 bits, a first part of the coded signal comprising N2 bits for identifying one of the M−N1+1 data ranges, wherein the N2 bits are a combination of 0 or 1 and each unique combination of N2 bits identifies one of the M−N1+1 data ranges, and a second part of the coded signal comprising N1 bits being the N1 consecutive bits $b_i, \ldots, b_{i+N1-1}$, of the M bits corresponding to said identified one of the M−N1+1 data ranges, wherein N1+N2<M, i>=0, i+N1−1<=M−1;

based on the coded signal, generate the drive signal comprising a sequence of N1 bits, each bit of the sequence of N1 bits maintaining a respective bit position in the M bits, each bit of said sequence of N1 bits, having a corresponding value according to the bit position, controlling a current through the light emitting element or a voltage across the light emitting element during a time interval, one bit at a time;

wherein M, N1, N2 and i are natural numbers.

* * * * *